(12) United States Patent
Ryan

(10) Patent No.: US 9,949,449 B2
(45) Date of Patent: Apr. 24, 2018

(54) GARDENING DEVICES FOR THE EFFICIENT WATERING OF PLANTS

(71) Applicant: Tom Ryan, Olympia, WA (US)

(72) Inventor: Tom Ryan, Olympia, WA (US)

(73) Assignee: Wiser Watering LLC, Olympia, WA (US)

( * ) Notice: Subject to any disclaimer, the term of this patent is extended or adjusted under 35 U.S.C. 154(b) by 0 days.

(21) Appl. No.: 15/611,619

(22) Filed: Jun. 1, 2017

(65) Prior Publication Data

US 2017/0347542 A1    Dec. 7, 2017

Related U.S. Application Data

(60) Provisional application No. 62/344,886, filed on Jun. 2, 2016.

(51) Int. Cl.
| | |
|---|---|
| *A01G 25/06* | (2006.01) |
| *A01G 29/00* | (2006.01) |
| *A62C 31/22* | (2006.01) |
| *B05B 1/20* | (2006.01) |
| *B05B 1/14* | (2006.01) |

(52) U.S. Cl.
CPC .............. *A01G 25/06* (2013.01); *A01G 29/00* (2013.01); *B05B 1/14* (2013.01); *A62C 31/22* (2013.01); *B05B 1/20* (2013.01); *B05B 15/622* (2018.02)

(58) Field of Classification Search
CPC .......... A01G 25/06; A01G 29/00; B05B 1/14; B05B 1/20; B05B 15/062; A62C 31/22
USPC .................. 239/590.3, 271, 526, 532, 533.3; 47/48.5; 111/7.2
See application file for complete search history.

(56) References Cited

U.S. PATENT DOCUMENTS

| | | | | |
|---|---|---|---|---|
| 1,906,621 A | * | 5/1933 | Knuth | B05B 15/10 |
| | | | | 239/204 |
| 1,925,622 A | * | 9/1933 | Anderson | A01G 29/00 |
| | | | | 111/7.1 |
| 2,224,010 A | * | 12/1940 | Barber | A62C 31/22 |
| | | | | 239/271 |

(Continued)

OTHER PUBLICATIONS

Gardenjet. Retrieved from http://www.gardenjet.net/products.html on May 30, 2017. All pages.

*Primary Examiner* — Darren W Gorman
*Assistant Examiner* — Joseph A Greenlund
(74) *Attorney, Agent, or Firm* — Lowe Graham Jones PLLC

(57) ABSTRACT

Embodiments are directed to a fluid-emission device. An example fluid-emission device includes a tubular body, a fluid-source coupler, and a tip member disposed opposite the tubular body from the fluid-source coupler. A fluid-transmission lumen in the tubular body fluidly couples the tip member to the fluid-source coupler. The tip member includes a plate having a plurality of fluid-emission lumens that fluidly couple the fluid-transmission lumen to an environment outside the tubular body. The tip member includes a spearhead disposed opposite the plate from the fluid-transmission lumen. The tip member has a spacer disposed between the plate and the spearhead to separate the spearhead from the fluid-emission lumens. The fluid-emission device can be used by inserting the tip member into material and delivering fluid to a target, such as delivering water or fertilizer to plant roots or the like.

20 Claims, 10 Drawing Sheets

(56) References Cited

U.S. PATENT DOCUMENTS

| | | | | |
|---|---|---|---|---|
| 2,380,721 A | * | 7/1945 | Brigden | A01C 21/00 111/99 |
| 2,505,174 A | * | 4/1950 | Daniels | A01G 29/00 111/7.1 |
| 2,993,650 A | * | 7/1961 | Badberg | A62C 31/22 239/271 |
| 3,026,827 A | * | 3/1962 | Cunningham | A01G 29/00 111/7.1 |
| 3,042,314 A | * | 7/1962 | Packard | B05B 7/2443 239/310 |
| 4,031,833 A | * | 6/1977 | Ibanez | A01C 21/00 111/7.1 |
| 4,393,622 A | * | 7/1983 | Gallo, Sr. | A01G 5/06 40/645 |
| 4,705,218 A | * | 11/1987 | Daniels | A01G 29/00 111/7.1 |
| 5,050,340 A | * | 9/1991 | Seifert | A01C 23/026 111/7.3 |
| 5,253,716 A | * | 10/1993 | Mitchell | A62C 31/22 169/70 |
| 5,279,073 A | * | 1/1994 | Czebieniak | A01G 9/122 47/47 |
| 5,322,085 A | * | 6/1994 | Prothe | A01C 23/026 137/268 |
| 5,325,626 A | * | 7/1994 | Jackson | A01M 17/002 239/271 |
| 5,409,067 A | * | 4/1995 | Esposito | A62C 3/07 169/62 |
| 5,558,030 A | * | 9/1996 | Ward | A01C 23/026 111/7.2 |
| 5,618,000 A | * | 4/1997 | Lantzy | A01G 29/00 111/7.1 |
| 5,671,887 A | * | 9/1997 | Iavarone | B05B 7/2445 111/7.1 |
| 5,727,484 A | * | 3/1998 | Childs | A01C 23/026 111/7.1 |
| 5,913,367 A | * | 6/1999 | Hampton | A62C 31/22 169/62 |
| 6,193,170 B1 | * | 2/2001 | Fitzgerald | A62C 31/22 239/271 |
| 6,220,525 B1 | * | 4/2001 | McSherdon | A01M 1/2044 111/7.1 |
| 6,308,454 B1 | * | 10/2001 | Powell | A01M 7/00 43/124 |
| 6,634,435 B2 | | 10/2003 | Saeger | |
| 6,964,124 B2 | * | 11/2005 | Brode, III | A01M 1/026 43/131 |
| 7,441,369 B1 | * | 10/2008 | McAtee | A01G 29/00 47/48.5 |
| 8,132,362 B2 | * | 3/2012 | King | A01G 29/00 405/45 |
| 8,671,614 B1 | * | 3/2014 | Doolittle | A01G 29/00 47/57.5 |
| 8,707,559 B1 | * | 4/2014 | Fugere | B21K 21/16 29/421.1 |
| 8,807,233 B2 | * | 8/2014 | Peltola | A62C 31/22 169/45 |
| 9,138,757 B2 | | 9/2015 | McLarty | |
| 2005/0135880 A1 | | 6/2005 | Stark | |

\* cited by examiner

GARDENING DEVICES FOR THE EFFICIENT WATERING OF PLANTS

CROSS-REFERENCE TO RELATED APPLICATIONS

This application claims the benefit of U.S. Provisional Application No. 62/344,886, entitled "GARDENING DEVICES FOR THE EFFICIENT WATERING AND LABELING OF PLANTS," filed 2 Jun. 2016, which is incorporated herein by reference in its entirety.

TECHNICAL FIELD OF THE INVENTION

The disclosure relates generally to emitting fluid and, more specifically yet not exclusively, to emitting fluid in a gardening environment.

BACKGROUND OF THE INVENTION

Handheld tools to water plants in a garden are widely available. Some of these tools are attachable to an ordinary garden hose to provide pressurized water to the tool and subsequently to the plants. Such handheld tools are typically held by a user, who then employs the tool to provide water to the foliage of the plants. Often, these tools are inefficient. For example, when watering multiple plants, water often pours from these tools between different plants and evaporates prior to absorption by the plants. Also, watering the areas between the plants and on plant foliage can attract unwanted mollusks, such as slugs. It is for these and other reasons that the following disclosure is provided.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various portions of the present innovations are directed to penetrating a solid material with a fluid-emission device and emitting fluids from the fluid-emission device before removing the fluid-emission device from the solid material. Examples of solid material include granular materials (for example, soil, snow, pharmaceutical powder, fertilizer, or the like) or nongranular materials (for example, drywall, flesh, or the like). For example, in a gardening context, the fluid-emission device may be used to deliver water to or about the roots of a plant by penetrating soil near the base of the plant and emitting water into the soil near the roots of the plant. In another example, the fluid-emission device may penetrate a solid material from one side of the solid material and emit fluid on the opposite side of the solid material (for example, drywall, a tunnel in soil, or the like).

Figure 1:
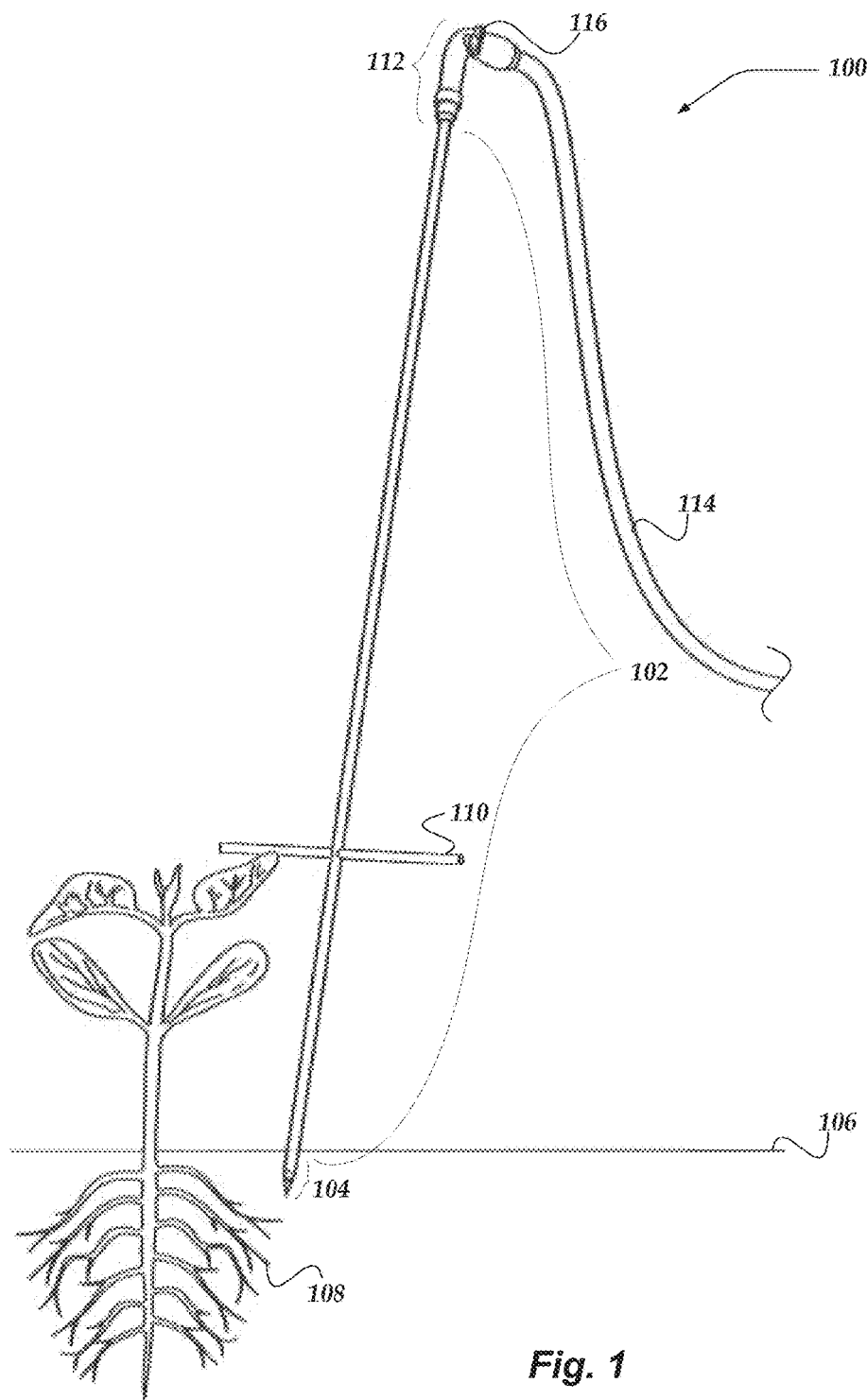
FIG. 1 illustrates a schematic representation of an example fluid-emission device.

FIG. 1 illustrates a schematic representation of fluid-emission device 100. Fluid-emission device 100 may include tubular body 102 and tip member 104. Tip member 104 may have a circular, rectangular, octagonal, or other cross-sectional shape. Fluid-emission device 100 may have one, two, three, or more tip members 104. Tip member 104 facilitates piercing solid matter to efficiently emit fluid in, through, or on the other side of the solid matter. For example, tip member 104 may pierce soil 106 to efficiently provide water (or other fluids such as fertilizer) to plant roots 108. Other examples may include piercing soil 106 to deliver poisonous or flammable fluid into a space, such as a tunnel.

Tubular body 102 may have circular, square, octagonal, or other shaped cross-sections. Tubular body 102 may be straight or have one or more curves along the longitudinal dimension of tubular body 102.

Figures 9A, 9B:
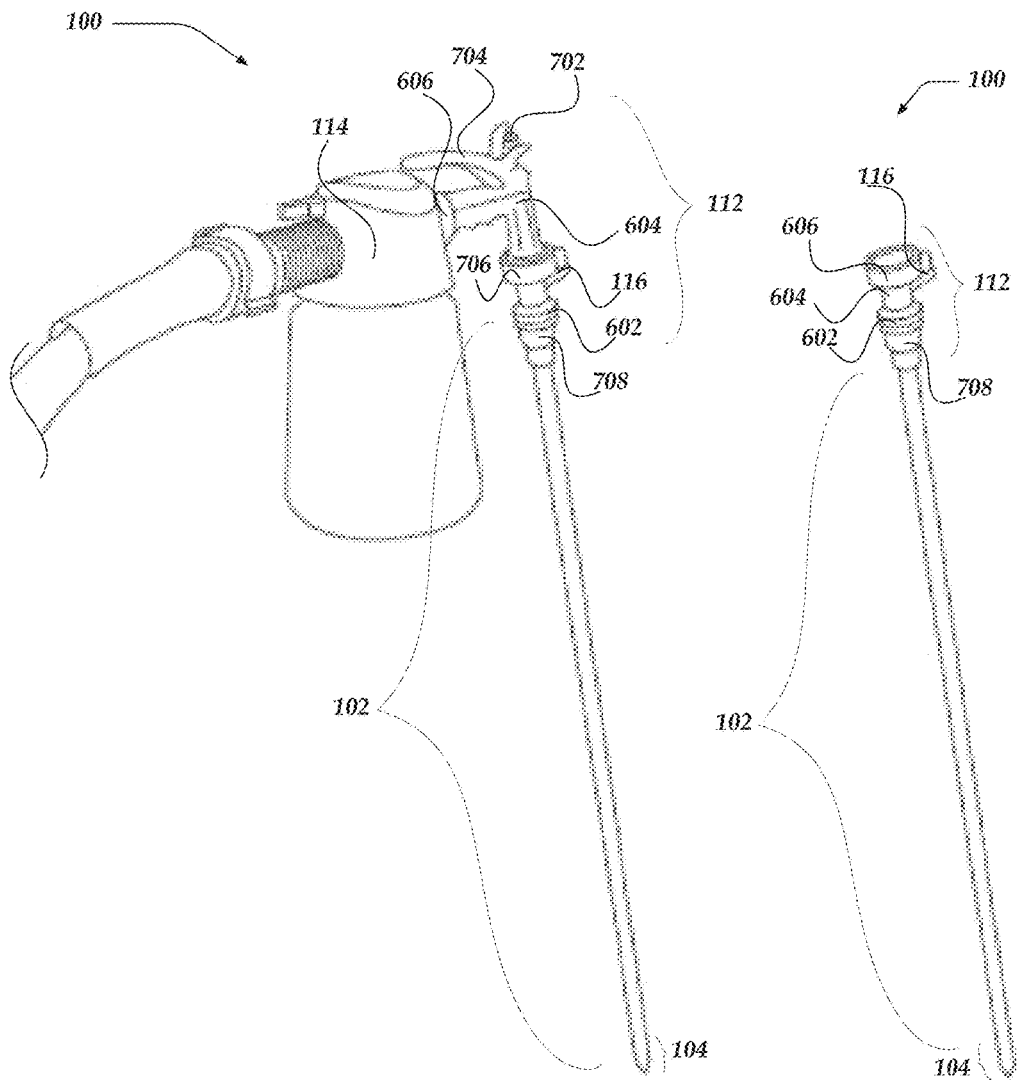
FIG. 9A illustrates a schematic representation of the fluid-emission device of FIG. 1 without foot pegs and coupled to an example fluid source.
FIG. 9B shows a schematic representation of the fluid-emission device of FIG. 1 with an example handle portion.

Fluid-emission device 100 may also include one or more foot pegs 110 attached to tubular body 102 to facilitate driving tip member 104 into or through solid matter. While FIG. 1 shows that fluid-emission device 100 has two foot pegs 110 to facilitate ambidextrous use, other examples of fluid-emission device 100 have zero (see FIGS. 9A and 9B), one, three, or four foot pegs 110 (for example, symmetrically disposed around the circumferential perimeter of tubular body 102) at the same or a different vertical position along tubular body 102. Foot pegs 110 may be integral to tubular body 102 (for example, welded, integrally formed, or the like). Alternatively, foot pegs 110 may be separable from tubular body 102 (rotatably separable via threading, slidably separable via friction fit, or another method of mechanical separation, such as clamps, clasps, or the like).

Fluid-emission device 100 may additionally include handle portion 112. Handle portion 112 may couple to fluid source 114, such as a hose, feeder hose end (see FIG. 9A), or the like. Alternatively, a fluid source may couple directly to tubular body 102, instead of handle portion 112. Handle portion 112 may include valve actuator 116 to control a volumetric flow rate of fluid flowing through fluid-emission device 100.

Fluid-emission device 100 may provide benefits over traditional hand-held fluid-emission devices. For instance, a user may employ fluid-emission device 100 to provide fluid (for example, water, fertilizer, or pesticide) to the foliage, soil, or root system without bending over. Furthermore, the provided fluid may be easily and efficiently targeted specifically to the soil's surface, the soil's sub-surface, or the plant's root zone or root system.

Fluid-emission device 100 may provide an increase in efficiency of fluid usage in various applications, such as gardening. For instance, because the fluid emission may be targeted at the soil's sub-surface or the plant's root system, fluid-emission device 100 may enable decreased fluid runoff or decreased evaporative loss. Furthermore, fluid-emission device 100 may be employed to emit fluid or aerate solid matter.

Accordingly, employment of the various embodiments discussed herein may facilitate efficient and effective fluid-emission practices that conserve fluid. Various embodiments discussed herein may promote healthy, aerated soil, as well as healthy plants. Various embodiments discussed herein may provide feedback to the user, such that the user becomes conscious of the volume of fluid emitted, as well as the excess amount of fluid that may be wasted during the fluid emission process.

Moreover, tip member 104 may facilitate easily penetrating solid matter to various selectable depths, such as a depth of plant roots 108 in soil 106.

Fluid-emission device 100 may have various lengths. For example, tubular body 102 in combination with tip member 104 may have a length of 10, 12, 14, 16, 18, 20, 22, 24, 26, 28, 30, 32, 34, 36, 38, 40, or more inches.

Tubular body 102 may be straight. Alternatively, tubular body 102 may have one or more curves. For example, a curve in tubular body 102 may facilitate emitting fluid in an elevated space, such as overhead (for example, a hanging watering basket).

Figure 2A:
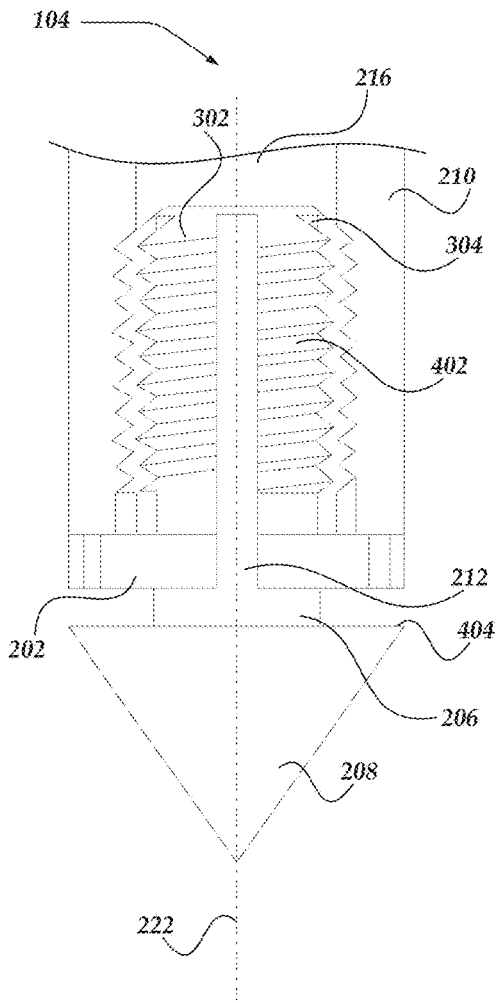
FIG. 2A shows a schematic representation of an example tip member of the fluid-emission device of FIG. 1.

FIG. 2A shows a schematic representation of a portion of an example tip member 104. Shaft 302 may have one or more helical ridges 402 (for example, threads) that separably mate with one or more corresponding helical ridges in the interior surface of wall 210 of tubular body 102. Shaft 302 may include fluid-transmission channels 304 that separate sections of helical ridges 402 and that fluidly couple fluid-emission lumens 212 to fluid-transmission lumen 216 in tubular body 102 (for example, space inside tubular body 102). Additionally or alternatively, the interior surface of wall 210 of tubular body 102 may include one or more fluid-transmission channels 304 that fluidly couple fluid-emission lumens 212 to fluid-transmission lumen 216.

In some examples, shaft 302 may be integral to spacer 206. The proximal end portion of shaft 302 may be tapered to facilitate insertion of shaft 302 into fluid-transmission lumen 216.

Figure 2B:
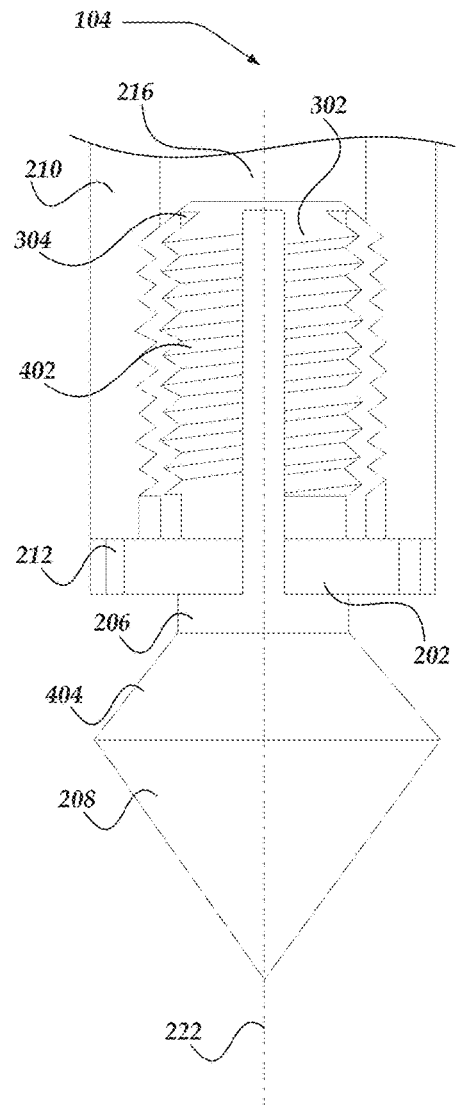
FIG. 2B illustrates a schematic diagram of an example tip member of the fluid-emission device of FIG. 1.

Proximal end portion 404 of spearhead 208 may have an upper surface that is flat, domed, coned, or formed in another shape. In the example shown in FIG. 2A, the upper surface is on a plane that is perpendicular to the longitudinal axis 222 of tip member 104. In contrast, FIG. 2B illustrates a schematic representation of an example portion of tip member 104, with proximal end portion 404 of spearhead 208 flaring in a distal direction along the longitudinal axis 222 of tip member 104 from spacer 206 to the point where spearhead 208 has a maximum circumferential perimeter length. In some examples, proximal end portion 404 of spearhead 208 may act as spacer 206.

The term "lumen" is used primarily herein when describing those aspects of device 100 that are used to carry, transmit, pass, or emit water or other fluids. In some circumstances, other terms such as "conduit," "bore," "channel," "opening," or the like may be used in place of "lumen." For example, in some embodiments, the tip member 104 is disposed opposite a fluid-transmission conduit. The tip member 104 has a longitudinal axis and comprises a shaft, a plate, a spearhead, and a spacer. The shaft extends along the longitudinal axis of the tip member and is removably coupled to the fluid-transmission conduit by way of threads or friction fit. The plate is disposed between the shaft and the spacer, radially extends from the longitudinal axis of the tip member, and has multiple fluid-emission conduits, each of which extend through the plate and fluidly couple the fluid-transmission conduit to an environment outside the tubular body. The fluid emission conduits may be formed by way of open channels cut into the plate and extending along the surface of the shaft, thereby providing a passageway for water or other liquids to flow from the fluid-transmission conduit to the environment. The spearhead is disposed opposite the plate from the fluid-transmission conduit and extends along the longitudinal axis of the tip member. In some embodiments, the spearhead has a diameter that is at least as large as the diameter of the plate, so as to reduce the amount of dirt, sand, or other material that enters into (and possibly clogs) the fluid-emission conduits when the tip is inserted into soil or other material. The spacer is disposed between the plate and the spearhead. The spacer extends along the longitudinal axis of the tip member and separates the spearhead from the fluid-emission conduits.

Figure 3A:
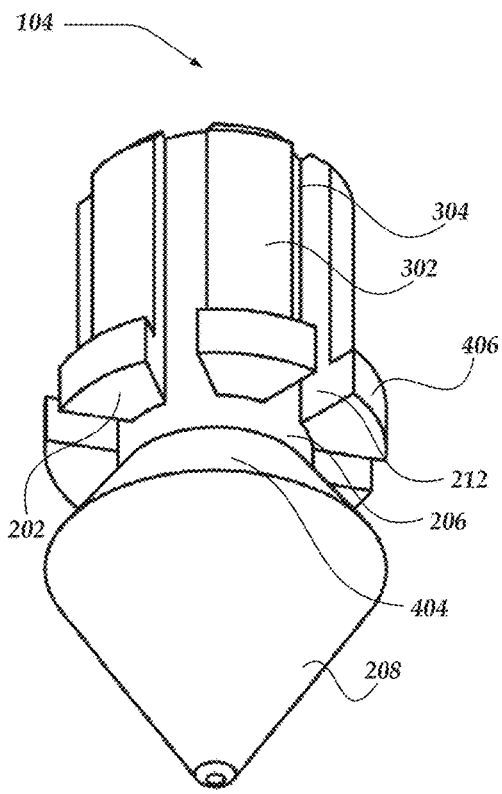
FIG. 3A shows a schematic diagram of an example tip member of the fluid-emission device of FIG. 1.
Figure 3B:
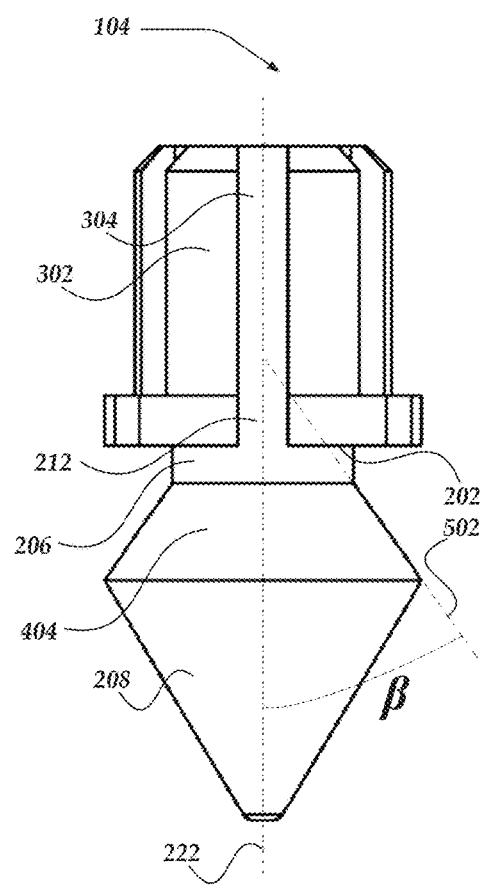
FIG. 3B illustrates a schematic representation of an example tip member of the fluid-emission device of FIG. 1.

FIG. 3A shows a schematic diagram of portion of an example tip member 104, with fluid-emission lumens 212 extending through the circumferential perimeter of plate 202. In some examples, shaft 302 has a smooth outer surface to facilitate separable coupling with tubular body 102 via friction fit. In other examples, the shaft 302 is threaded to facilitate coupling with corresponding threads in the interior surface of wall 210 of tubular body 102 (see FIGS. 2A and 2B). In some examples, spearhead 208 may have a sharp tip to facilitate piercing solid matter (see FIGS. 2A, 2B, 4A, 4B, 4C, and 5). In other examples, spearhead 208 may have a slightly blunted tip (FIGS. 3A and 3B) to promote longevity of spearhead 208 (for example, by reducing deformation of spearhead 208 from repeated contact with solid matter).

Proximal end portion 404 of spearhead 208 may have an upper surface that is positioned and oriented to interrupt flow of streams 220. In some examples, the maximum length of the circumferential perimeter of spearhead 208 may be at least as great as the maximum length of the circumferential perimeter of spacer 206, the maximum length of the circumferential perimeter of shaft 302, the length of the circumferential perimeter of the distal-most portion of fluid-transmission lumen 216, the length of the circumferential perimeter of a boundary on plate 202 that encompasses fluid-emission lumen 212, the length of the circumferential perimeter of plate 202, the length of the circumferential perimeter of the distal-most portion of tubular body, or the like. The upper surface of proximal end portion 404 of spearhead 208 may be disposed at angle β relative to the longitudinal axis 222 of tip member 104, such as 0, 5, 10, 12.5, 15, 17.5, 20, 22.5, 25, 27.5, 30, 33.5, 35, 40, 45, 50, 60, 70, 80, 90, or more degrees relative to the longitudinal axis 222 of tip member 104.

Figure 4A:
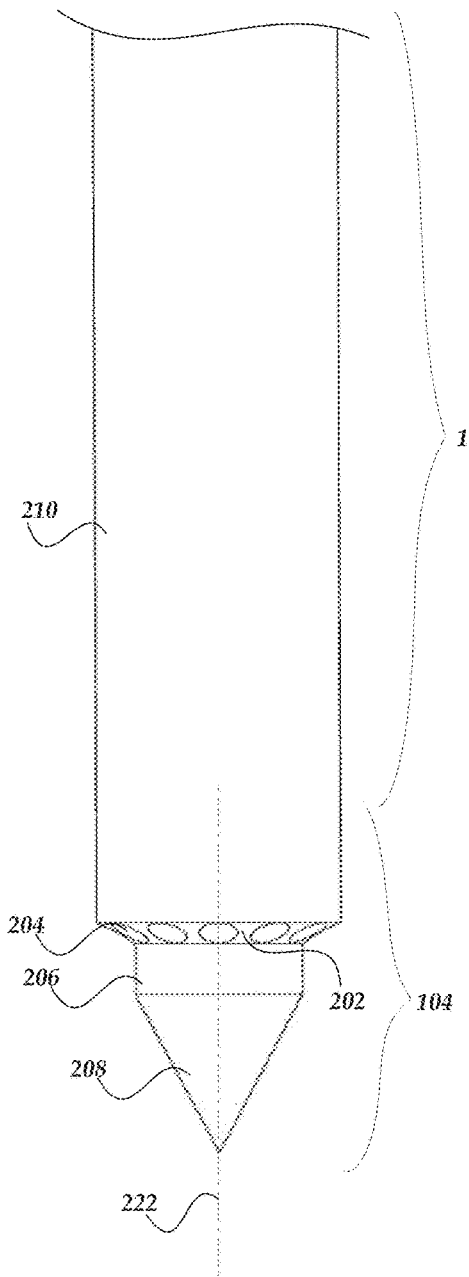
FIG. 4A shows a schematic representation of an example tip member of the fluid-emission device of FIG. 1.

FIG. 4A shows a schematic representation of a portion of an example fluid-emission device 100. One or more portions of tip member 104 may be integral to tubular body 102 (for example, welded, integrally formed, or the like). Tip member 104 includes plate 202 extending radially from the longitudinal axis 222 of tip member 104. Plate 202 may have a flat, dome, or cone shape. In some examples, plate 202 has a flat upper surface and a dome- or cone-shaped bottom surface. Plate 202 may have a circular, rectangular, octagonal, or other cross-sectional shape. Plate 202 may be integral to tubular body 202 (for example, welded, integrally formed, or the like). Alternatively, plate 202 may be separable from tubular body 202 (for example, rotatably separable via threading, slidably separable via friction fit, or another method of mechanical separation, such as clamps, clasps, or the like).

Plate 202 has a plurality of fluid-emission apertures 204 in the bottom side of plate 202. In some examples, each fluid-emission aperture 204 may be spaced apart from the circumferential perimeter of plate 202. In some examples, fluid-emission apertures 204 may be arranged in one or more rows.

Spacer 206 separates spearhead 208 from fluid-emission apertures 204. Spacer 206 and spearhead 208 may have the same or different cross-sectional shapes as each other, such as circular, rectangular, octagonal, or another cross-sectional shape. The circumferential perimeter of spearhead 208 tapers in a distal direction along the longitudinal axis 222 of tip member 104 from a maximum length to a minimum length. Spacer 206 may be integral to plate 202 (for example, welded, integrally formed, or the like). Alternatively, spacer 206 may be separable from plate 202 (for example, rotatably separable via threading, slidably separable via friction fit, or another method of mechanical separation, such as clamps, clasps, or the like). Spearhead 208 may be integral to spacer 206 (for example, welded, integrally formed, or the like). Alternatively, spearhead 208 may be separable from spacer 206 (for example, rotatably separable via threading, slidably separable via friction fit, or another method of mechanical separation, such as clamps, clasps, or the like). In some examples, spacer 206 may be part of spearhead 208, such as a proximal end portion of spearhead 208. Spacer 206 may have a circular, cross, rectangular, octagonal, or any other shaped cross-section. Spacer 206 may be straight or may have one or more curves along the longitudinal axis 222 of tip member 104.

Figure 4B:
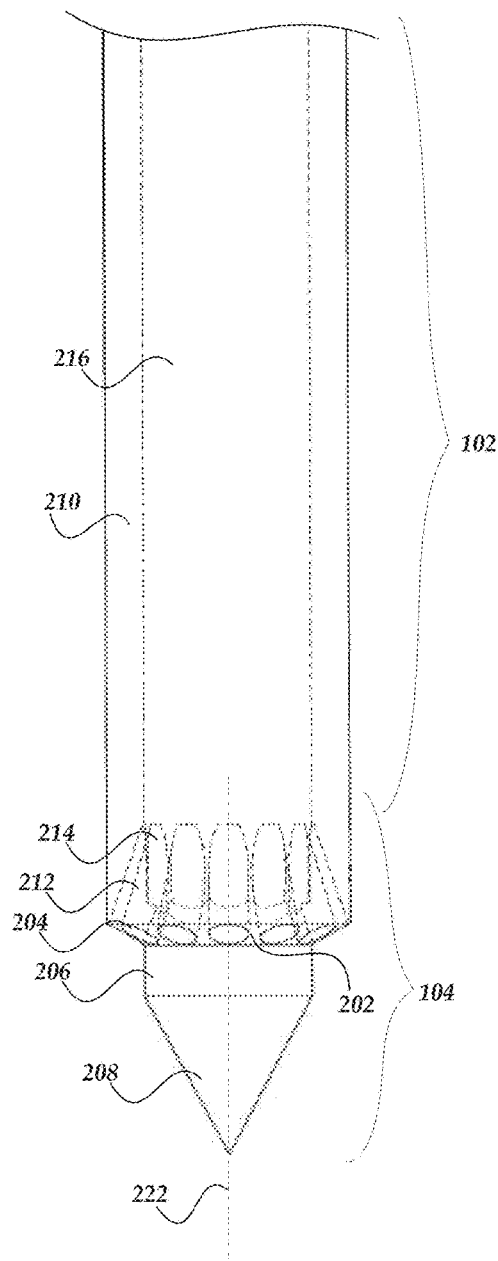
FIG. 4B illustrates a schematic diagram of the tip member of FIG. 4A with hidden lines.

FIG. 4B illustrates a schematic diagram of a portion of an example fluid-emission device 100 with hidden lines. Wall 210 of tubular body 102 has an outer surface and an inner surface. In the example illustrated in FIG. 4B, the inner surface of wall 210 defines fluid-transmission lumen 216. Fluid-transmission lumen 216 extends from the proximal end portion to the distal end portion of tubular body 102. Tubular body 102 may have one, two, three, or more fluid-transmission lumens 216.

Fluid-emission apertures 204 are part of corresponding fluid-emission lumens 212. Fluid-emission lumens 212 include interior apertures 214 in the top side of plate 202. Interior apertures 214 connect fluid-emission lumens 212 to fluid-transmission lumen 216. Fluid-emission lumens 212 extend through plate 202. Fluid-emission lumens 212 may be straight or may have one or more curves.

Figure 4C:
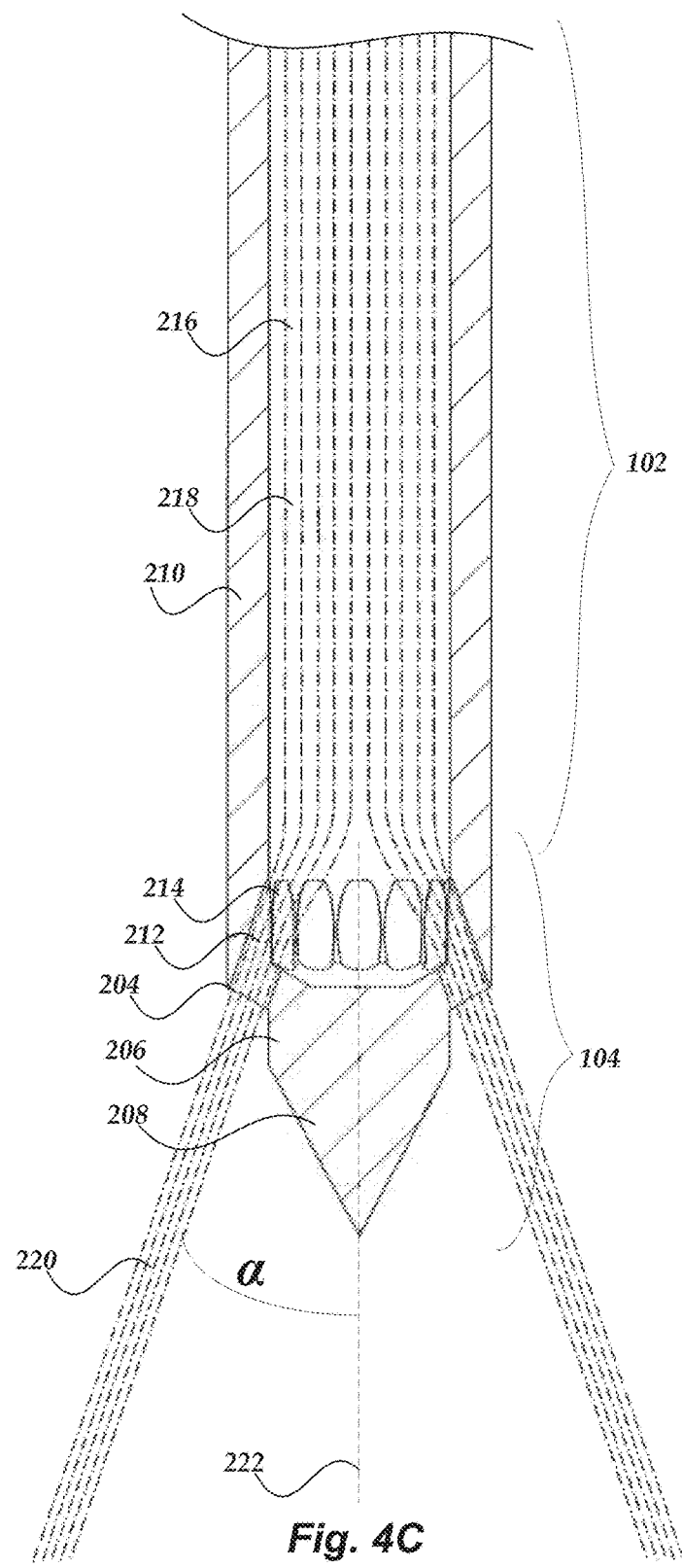
FIG. 4C shows a schematic diagram of the tip member of FIG. 4A with partial cross-sectional views.

FIG. 4C shows a schematic diagram of a portion of an example fluid-emission device 100 with portions of fluid-emission device 100 removed to show various cross-sectional features of fluid-emission device 100. Fluid-transmission lumen 216 transmits fluid 218 to fluid-emission lumens 212. Fluid-emission lumens 212 are disposed at angles that cause fluid-emission lumens 212 to emit fluid 218 in streams 220 at angle α, relative to the longitudinal axis 222 of tip member 104. In some examples, angle α may be 10, 12.5, 15, 17.5, 20, 22.5, 25, 27.5, 30, 35, 40, 45, or more degrees.

In the example shown in FIG. 4C, tip member 104 is a single-piece construction. In this example, tip member 104 is integral with tubular body 102 (for example, welded or integrally formed). In other examples, tip member 104 may be separable from tubular body 102. Tip member 104 may be rotatably separable via threading (see FIGS. 2A and 2B), slidably separable via friction fit (see FIGS. 3A, 3B, and 5), or another method of mechanical separation, such as clamps, clasps, or the like. In other examples, tip member 104 may include separate pieces.

Figure 5:
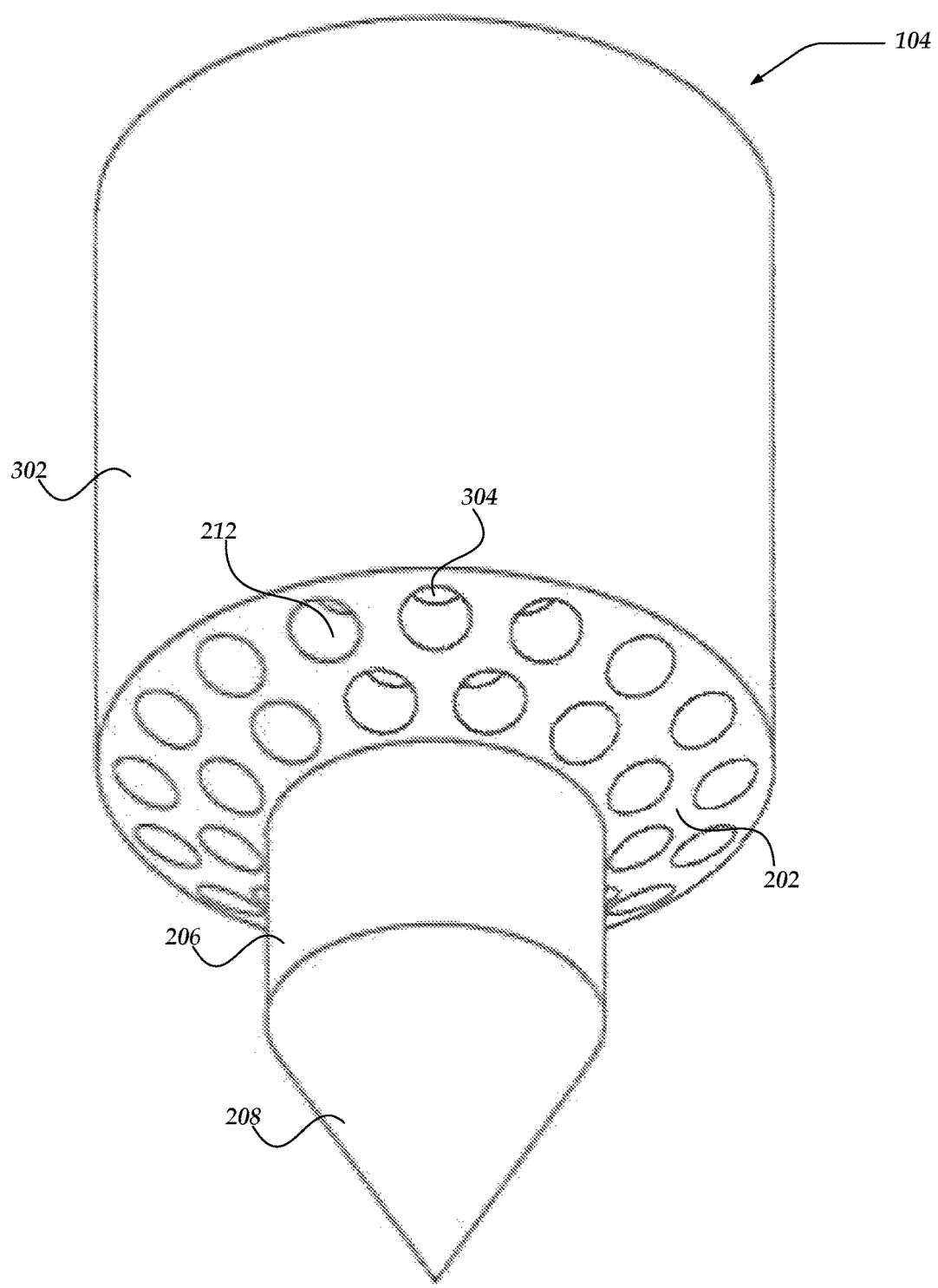
FIG. 5 illustrates a schematic representation of an example tip member of the fluid-emission device of FIG. 1.

FIG. 5 illustrates a schematic representation of a portion of an example tip member 104. In this example, tip member 104 includes a shaft 302 that extends from plate 202. Shaft 302 may be integral to plate 202 (for example, welded, integrally formed, or the like) or may be separable from plate 202 (for example, rotatably separable via threading, slidably separable via friction fit, or another method of mechanical separation, such as clamps, clasps, or the like). For example, shaft 302 may be sized and dimensioned to secure tip member 104 to tubular body 102 by friction fit in fluid-transmission lumen 216 when shaft 302 is slidably inserted into fluid-transmission lumen 216. In other examples, shaft 302 is threaded to facilitate coupling with threads in the interior surface of wall 210 of tubular body 102.

In the example illustrated in FIG. 5, shaft 302 has one or more fluid-transmission channels 304 that fluidly couple fluid-emission lumen 212 to fluid-transmission lumen 216. In the perspective view shown in FIG. 5, one or more fluid-transmission channels 304 may be viewable through one or more fluid-emission lumens 212. In some examples, shaft 302 may have fewer fluid-transmission channels 304 than the number of fluid-emission lumens 212, in which case a fluid-transmission channel may fluidly couple multiple fluid-emission lumens 212 to fluid-transmission lumen 216. Alternatively, shaft 302 may have one fluid-transmission channel 304 per fluid-emission lumen 212, with each fluid-transmission channel 304 fluidly coupling a respective fluid-emission lumen to fluid-transmission lumen 216. Additionally or alternatively to the fluid-transmission channel being interior to shaft 302 as illustrated in FIG. 5, the fluid-transmission channel may be exterior to shaft 302 (see FIGS. 2A, 2B, 3A, and 3B).

Figure 6:
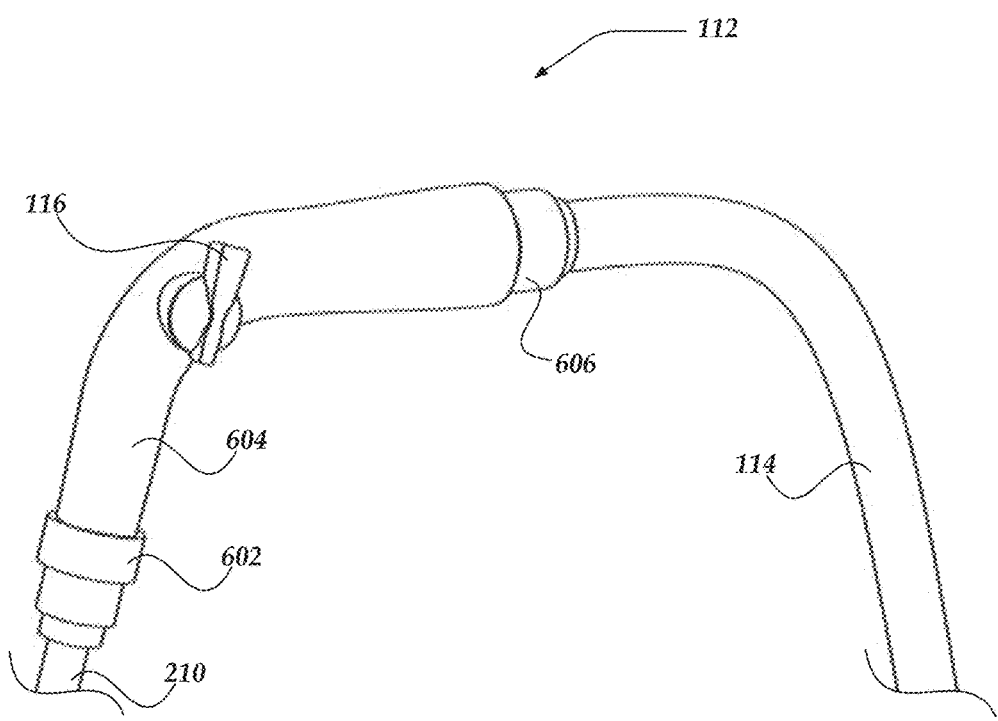
FIG. 6 shows a schematic representation of an example handle portion of the fluid-emission device of FIG. 1.

FIG. 6 shows a schematic representation of an example handle portion 112 to highlight exemplary components at the proximal end portion of tubular body 102. Fluid-source coupler 602 may be disposed at the proximal end portion of wall 210 of tubular body 102. In some examples, fluid-source coupler 602 may be a female coupler that receives a fluid-emission portion of handle 604. For example, fluid-source coupler 602 may have female threading that corresponds to male threading at the fluid-emission portion of handle 604. Fluid-source coupler 602 may rotate independently of tubular body 102 to facilitate securing or removing handle 604 or fluid source 114 to or from tubular body 102. The fluid-receiving portion of handle 604 may have another fluid-source coupler 606. In some examples, fluid-source coupler 606 may be a female coupler that receives a fluid-delivery portion of fluid source 114. Fluid-source coupler 604 may rotate independently of handle 604 to facilitate securing or removing fluid source 114 to or from handle 604.

A valve and corresponding valve actuator 116 may be disposed at the proximal end portion of tubular body 102. In some examples, the valve and corresponding valve actuator 116 may be integral to handle 604. In other examples, the pipe section containing the valve corresponding to valve actuator 116 may be integral to tubular body 102. In the example shown in FIG. 6, valve actuator 116 includes a lever that can be pulled away from or pushed toward handle 604 to actuate the valve (for example, opening the valve when moving the lever in one direction and closing the valve when moving the lever in the other direction). Handle 604 may have a shape that facilitates use of fluid-emission device 100 while gripping handle 604, such as the shape of the pistol grip shown in FIG. 6. For example, pushing the lever toward the pistol grip may open the valve, and pulling the lever away from the pistol grip may close the valve. In other examples, handle 604 may be straight instead of curved (see FIG. 9B).

Figure 8:
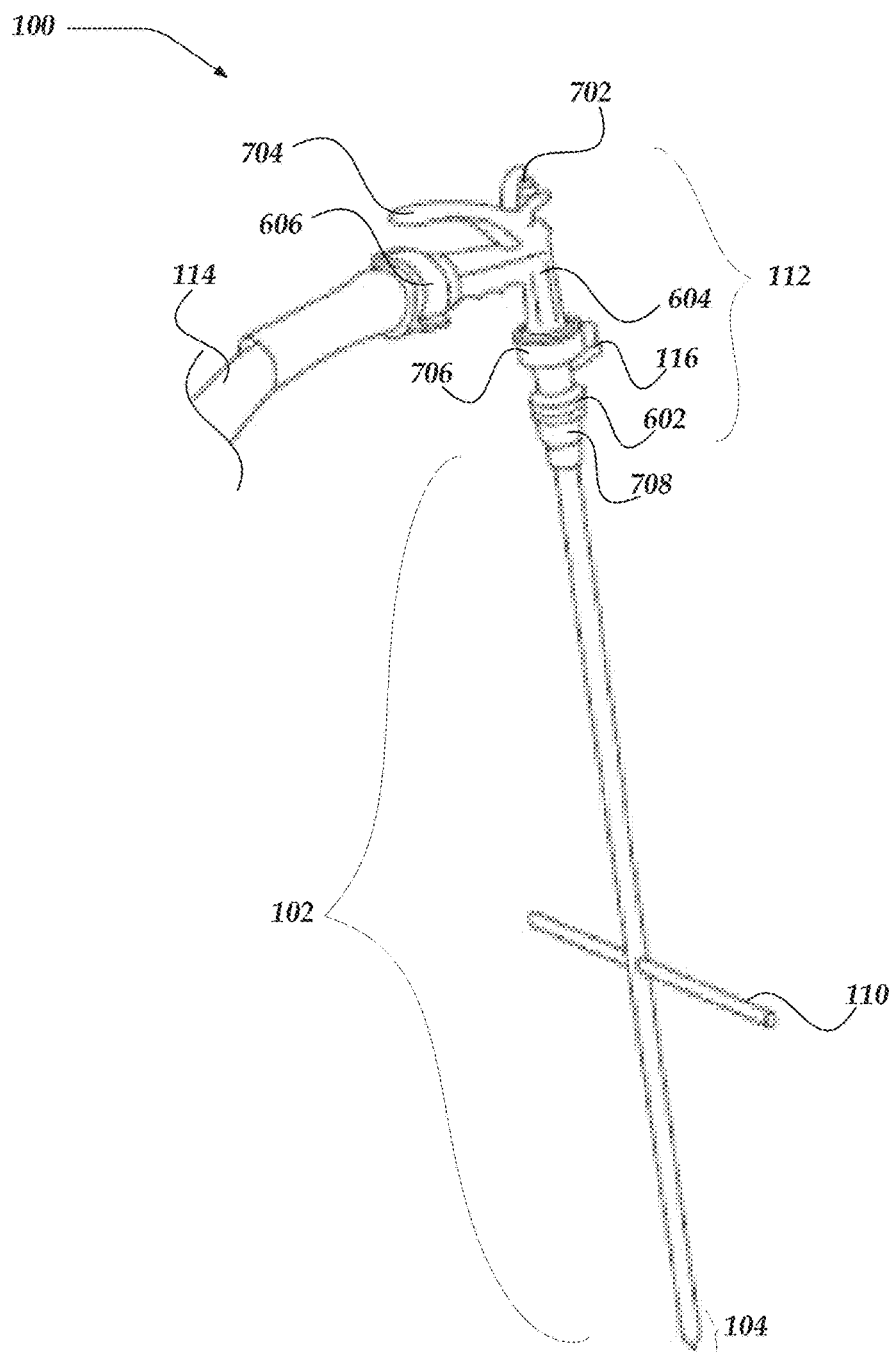
FIG. 8 shows a schematic diagram of the fluid-emission device of FIG. 1 with an example handle portion.

The valve may alter a volumetric flow rate of fluid flowing into fluid-transmission lumen 216 from fluid source 114 when fluid-source coupler 606 is coupled to fluid-source 114 and the valve is actuated. In some examples, valve actuator 116 may autonomously maintain a given position until acted against by an external force that displaces valve actuator 116 to another position. For example, valve actuator 116 may maintain a given position based on friction between components (for example, friction between the lever and other components, such as handle 604). Examples of the valve include a flow control valve, such as a globe, diaphragm, ball, gate, or butterfly valve. The pistol grip may have finger bumps to improve grip or to facilitate consistent hand location when gripping handle 604 (see FIGS. 8 and 9A).

Figure 7:
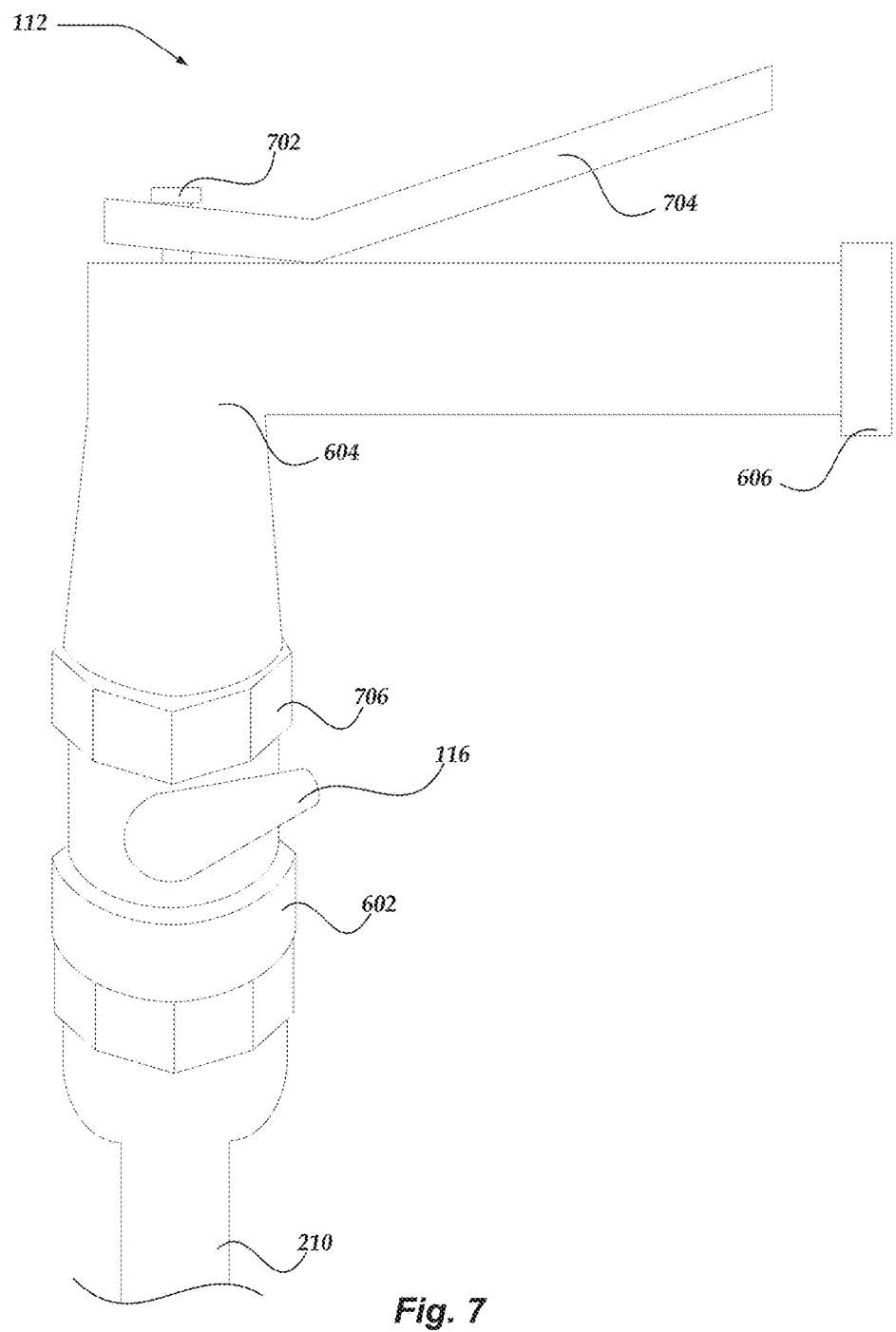
FIG. 7 illustrates a schematic diagram of an example handle portion of the fluid-emission device of FIG. 1.

FIG. 7 illustrates a schematic diagram of an example handle portion 112 to highlight exemplary components at the proximal end portion of tubular body 102. In some examples, fluid-emission device 100 may have multiple valves at the proximal end portion of tubular body 102. For example, valve 702 may alter a volumetric flow rate of fluid flowing into fluid-transmission lumen 216 when actuated based on moving valve actuator 704 toward or away from pistol-grip handle 604. Valve 702 may be spring loaded to facilitate returning valve 702 to a closed position when valve actuator 704 is released. Valve 702 may be distal or proximal to valve actuator 116 and the valve actuated by valve actuator 116. For example, handle 604 may couple directly to fluid-source coupler 602 while the pipe section that contains the valve corresponding to valve actuator 116 may couple directly to fluid-source coupler 606.

In some examples, valve actuator 116 and the correspond valve may be separable from handle 604. For example, the proximal end portion of the pipe section that contains the valve associated with valve actuator 116 may include fluid-source coupler 706. Fluid-source coupler 706 may be a female coupler that receives a fluid-emission portion of handle 604. For example, fluid-source coupler 706 may have female threading that corresponds to male threading at the fluid-emission portion of handle 604. Fluid-source coupler 706 may rotate independently of the pipe section to facilitate securing or removing handle 604 or fluid source 114 to or from the pipe section. The distal end portion of the pipe section may include male threading that separably secures the pipe section to fluid-source coupler 602. In some examples, fluid-emission device 100 may be operated by setting valve actuator 116 to a position that provides desired flow when valve actuator 704 is fully depressed to facilitate varying the amount of flow without concern for precise movement of valve actuator 704 to a position associated with partial opening of valve 702.

In some examples, the proximal end portion of tubular body 102 may have a shape that resembles a nut (for example, having six or eight sides) to facilitate gripping the proximal end portion of tubular body 102 with a wrench.

Tip member 104 may have a longitudinal length of 0.3, 0.35, 0.4, 0.45, 0.5, 0.55, 0.6, 0.65, 0.7, 0.75, 0.8, 0.85, 0.9, 0.95, 1, 1.05, 1.1, 1.2, 1.3, 1.4, 1.5, 2, 3, or more inches. Shaft 302 has a diameter that is perpendicular to longitudinal axis 222 of tip member 104, such as a diameter of 0.2, 0.3, 0.4, 0.5, 0.6, 0.7, 0.8, 0.9, 1, 1.1, 1.2, 1.3, 1.4, 1.5, 2, 3, or more inches. Plate 202 has diameter that is perpendicular to longitudinal axis 222 of tip member 104, such as a diameter of 0.2, 0.3, 0.4, 0.5, 0.6, 0.7, 0.8, 0.9, 1, 1.1, 1.2, 1.3, 1.4, 1.5, 2, 3, or more inches. Plate 202 has a longitudinal length, such as a longitudinal length of 0.05, 0.1, 0.15, 0.2, 0.25, 0.3, 0.35, 0.4, 0.45, 0.5, 1, or more inches. Spacer 206 has a longitudinal length, such as a longitudinal length of 0.05, 0.1, 0.15, 0.2, 0.25, 0.3, 0.35, 0.4, 0.45, 0.5, 1, or more inches. Spacer 206 has a diameter that is perpendicular to longitudinal axis 222 of tip member 104, such as a diameter of 0.2, 0.3, 0.4, 0.5, 0.6, 0.7, 0.8, 0.9, 1, 1.1, 1.2, 1.3, 1.4, 1.5, 2, 3, or more inches. Spearhead 208 has a longitudinal length, such as a longitudinal length of 0.2, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.4, 1.5, 2, 3, or more inches. Spearhead 208 has a maximum diameter that is perpendicular to the longitudinal axis 222 of tip member 104, such as a maximum diameter of 0.2, 0.3, 0.4, 0.5, 0.6, 0.7, 0.8, 0.9, 1, 1.1, 1.2, 1.3, 1.4, 1.5, 2, 3, or more inches. In typical examples, spearhead 208 has a diameter that is no less than the diameter of the plate 202. In this manner, the spearhead 208 serves as a shield for fluid emission or transmission lumens to reduce the likelihood that these elements become clogged with solid matter as the tip member passes into the solid matter (for example, soil). Fluid-transmission channel 304 may have a diameter that is radially perpendicular to the longitudinal axis 222 of tip member 104, such as a maximum diameter of 0.05, 0.1, 0.15, 0.2, 0.25, 0.3, 0.35, 0.4, 0.45, 0.5, 0.6, 0.7, 0.8, 0.9, 1, 1.1, 1.2, 1.3, 1.4, 1.5, 2, 3, or more inches.

A method of using fluid-emission device 100 to provide fluid to a target area may include providing fluid-emission device 100, including tubular body 102, tip member 104, and handle portion 112. One or more portions of these elements may be integral or separable from each other (for example, as explained above). Alternatively, the method may include providing fewer than all of these elements, such as one or two of these elements or one or more portions thereof. In some examples, the elements or one or more portions thereof may be provided together or separately from each other. In examples where one or more of the elements or one or more portions thereof are provided separately from each other, the method may include separate acts of providing the separate elements or portions thereof. In examples where one or more of the elements or portions thereof are separable, the method may include mechanically coupling the separable elements or portions thereof, such as mechanically coupling one or more portions of tip member 104 to tubular body 102, mechanically coupling one or more portions of handle portion 112 to tubular body 102, or the like.

The method may also include coupling fluid-emission device 100 to a fluid source (for example, a hose that leads to a faucet, backpack container, compressed fluid tank, or the like). Next, one or more of valve actuators 116 or 704 may be moved or adjusted to alter the volumetric flow rate of fluid flowing through fluid-emission device 100. This act may be repeated until the desired volumetric flow rate is observed.

In some examples, once the desired volumetric flow rate is achieved, one of valve actuators 116 or 704 may be moved to stop the flow of fluid through fluid-emission device 100 to conserve fluid. Next, tip member 104 of fluid-emission device 100 may be driven through a solid material at or about a target area. Tip member 104 may be driven through the solid material as a result of applying force to foot peg 110, tubular body 102, or handle portion 112. In some examples, force may be applied to foot peg 110 via a user's foot (for example, downward or horizontal force) or hand (for example, horizontal or upward force). In some examples, force may be applied to tubular body 102 via a user's hand that grips tubular body 102. This act may be repeated or continued until tip member 104 reaches area desired distance beyond the surface of the solid material (for example, a desired depth in soil, a desired distance beyond the outer surface of drywall, or the like). In some examples, various depth markings may be provided along the outer surface of tubular body 102 to indicate the distance that tip member 104 traveled beyond the surface of solid material (for example, the smallest visible number from the user's perspective may indicate the distance).

Once tip member 104 is at or near the desired distance, one or more of valve actuators 116 or 704 may be moved to emit fluid from tip member 104 with the desired volumetric flow rate for an amount of time to emit the desired amount of fluid (for example, the appropriate amount to water a plant having roots at or near tip member 104 or the like). Once the desired amount of fluid has been emitted from tip member 104, one or more of valve actuators 116 or 704 may be moved to stop the flow of fluid through fluid-emission device 100 to conserve fluid. While or after moving one or more of valve actuators 116 or 704 to stop the flow of fluid, tip member 104 may be removed from the solid material.

In some examples, one or more acts of the method may be repeated at the same or another target area with the same or another fluid with the same or another desired volumetric flow rate. Once fluid has been emitted at each target area, one or more of valves 116 or 704 may be moved to set the desired volumetric flow rate to zero or fluid-emission device 100 may be disconnected from the fluid source.

In some examples, the fluid-emission device may include a tip member. The tip member may have a plate that has fluid-emission lumens. The tip member has a spearhead that facilitates penetrating solid material. The fluid-emission lumens facilitate emitting fluid from the tip member before removing the tip member from the solid material. The tip member may have a spacer that separates the spearhead from the fluid-emission lumens. In some examples, the plate may act as the spacer. In some examples, a proximal end portion of the spearhead may act as the spacer or the plate. In some examples, one or more portions of the tip member may be integral to each other. Additionally or alternatively, one or more portions of the tip member may be separable from each other.

In some examples, the fluid-emission lumens may be oriented to emit fluid at an outward angle from a central axis of the tip member. In some examples, the spearhead may be shaped or positioned to shield the one or more fluid-emission lumens from solid material as the tip member penetrates the solid material. For example, the distal end portion of the tip may have an angle to facilitate the spearhead displacing the solid material from the impending path of the fluid-emission lumens during the penetration process. As another example, the circumferential perimeter of the spearhead may have a maximum length that meets or exceeds the length of a circumferential boundary that encompasses the fluid-emission lumens to facilitate the spearhead traveling the impending path of the fluid-emission lumens prior to the fluid-emission lumens during the penetration process. In some examples, the spearhead may be shaped or positioned to redirect one or more streams of fluid emitted from the one or more fluid-emission lumens.

In some examples, the fluid-emission device may include a tubular body. The tip member may be disposed at the distal end portion of the tubular body. A fluid-source coupler disposed at the proximal end portion of the tubular body may fluidly couple the tubular body to a fluid source. The tubular body has a fluid-transmission lumen that transmits fluid from the fluid source to the tip member. The fluid-transmission lumen of the tubular body may be fluidly coupled to an environment that is outside the tubular body via the fluid-emission lumens of the tip member.

In some examples, the fluid-emission device may include one or more valves and one or more corresponding valve actuators. Actuation of each valve may adjust the volumetric flow rate of fluid that flows through the fluid-transmission lumen. Displacement of each valve actuator may actuate a corresponding valve. In some examples, one or more of the valve actuators may autonomously maintain a given position until acted upon by an external force, such as movement by a user's hand. In some examples, one or more of the valve actuators may be spring loaded to cause the valve actuator to autonomously return to a given position upon removal of an external force.

In some examples, the fluid-emission device may include a handle that is disposed at the proximal end portion of the tubular body. The handle may have a pistol grip to facilitate applying a penetrating force via the fluid-emission device, control of the volumetric flow rate of the fluid after penetrating a solid material while gripping the fluid-emission device, or the like.

In some examples, the fluid-emission device may include one or more foot pegs that are mechanically coupled to the tubular body. The foot peg may be positioned and oriented to facilitate applying a penetrating force via the fluid-emission device. For example, a user may press on the foot peg with the user's foot when penetrating a horizontal surface in a downward direction, may press on the foot peg with the user's hand when penetrating a vertical surface in a sideways direction, or may press on the foot peg with the user's hand when penetrating a horizontal surface in an upward direction.

One or more portions of the tip member may be integral to the tubular body. Additionally or alternatively, one or more portions of the tip member may be separable from the tubular body. For example, the tip member may have a portion that is insertable into the fluid-transmission lumen of the tubular body. In some examples, the insertable portion of the tip member may include one or more fluid-transmission channels that fluidly couple the fluid-transmission lumen of the tubular body to the fluid-emission lumens of the tip member.

Various examples have been described more fully above with reference to the accompanying drawings, which form a part hereof, and which show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The present detailed description is, therefore, not to be taken in a limiting sense.

Throughout the specification and claims, the following terms take the meanings explicitly associated herein, unless the context clearly dictates otherwise. The phrase "in one embodiment" or "in one example" as used herein does not necessarily refer to the same embodiment, though it may. Furthermore, the phrase "in another embodiment" or "in another example" as used herein does not necessarily refer to a different embodiment, although it may. Thus, as described throughout, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Further, plural references should be interpreted as also disclosing singular references. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. Each disclosed feature or element can be omitted or can be implemented in the fluid-emission device 100 in addition or alternative to each other disclosed feature, unless clearly described otherwise. Accordingly, the scope of the invention is not limited by the disclosure of the preferred embodiment. Instead, the invention should be determined entirely by reference to the claims that follow.

What is claimed as new and desired to be protected by Letters Patent of the United States is:

1. A fluid-emission device, comprising:
    a tubular body having a proximal end portion, a distal end portion, a longitudinal dimension, an inner surface, and a fluid-transmission lumen extending along the longitudinal dimension of the tubular body from the proximal end portion of the tubular body to the distal end portion of the tubular body;
    a fluid-source coupler disposed at the proximal end portion of the tubular body, the fluid-source coupler fluidly coupling the fluid-transmission lumen to a fluid source when the fluid-source coupler is coupled to the fluid source; and
    a tip member disposed opposite the fluid-transmission lumen from the fluid-source coupler, the tip member having a longitudinal axis, the tip member comprising:
    a plate radially extending from the longitudinal axis of the tip member, the plate having a plurality of fluid-emission lumens, each of the fluid-emission lumens extending through the plate and fluidly coupling the fluid-transmission lumen to an environment outside the tubular body;
    a spearhead disposed opposite the plate from the fluid-transmission lumen, the spearhead extending along the longitudinal axis of the tip member;
    a spacer disposed between the plate and the spearhead, the spacer extending along the longitudinal axis of the tip member and separating the spearhead from the fluid-emission lumens: and
    a shaft extending from the plate into the fluid-transmission lumen, the shaft having a proximal end portion, a distal end portion, a longitudinal dimension, and a fluid-transmission channel, the fluid-transmission channel extending from the proximal end portion of the shaft to the distal end portion of the shaft and fluidly coupling one of the fluid-emission lumens to the fluid-transmission lumen, the fluid-transmission channel being exposed to a portion of the inner surface of the tubular body along the longitudinal dimension of the shaft, wherein the fluid-transmission channel is on the outside of the shaft facing a portion of the inner surface of the tubular body.

2. The fluid-emission device of claim 1, further comprising:
    a valve disposed at the proximal end portion of the tubular body between the fluid-transmission lumen and the fluid-source coupler, the valve altering a volumetric flow rate of fluid flowing into the fluid-transmission lumen from the fluid source when the fluid-source coupler is coupled to the fluid source and the valve is actuated; and
    a valve actuator mechanically coupled to the valve, the valve actuator actuating the valve when the valve actuator is displaced.

3. The fluid-emission device of claim 1, further comprising:
    a valve disposed at the proximal end portion of the tubular body between the fluid-transmission lumen and the fluid-source coupler, the valve altering a volumetric flow rate of fluid flowing into the fluid-transmission lumen from the fluid source when the fluid-source coupler is coupled to the fluid source and the valve is actuated;
    a pistol grip disposed at the proximal end portion of the tubular body, the pistol grip having an interior lumen, the interior lumen of the pistol grip fluidly coupling the fluid-source coupler to the fluid-transmission lumen; and
    a valve actuator mechanically coupled to the valve, the valve actuator actuating the valve when the valve actuator is moved toward the pistol grip or away from the pistol grip.

4. The fluid-emission device of claim 1, further comprising:
    a first valve disposed at the proximal end portion of the tubular body between the fluid-transmission lumen and the fluid-source coupler, the first valve altering a volumetric flow rate of fluid flowing into the fluid-transmission lumen from the fluid source when the fluid-source coupler is coupled to the fluid source and the first valve is actuated;
a first valve actuator mechanically coupled to the first valve, the first valve actuator autonomously maintaining a given position until application of an external force to the first valve actuator displaces the first valve actuator to another position where the first valve actuator autonomously maintains the other position until another application of the external force to the first valve actuator displaces the first valve actuator, the first valve actuator actuating the first valve when the first valve actuator is displaced;
a second valve disposed at the proximal end portion of the tubular body between the fluid-transmission lumen and the fluid-source coupler, the second valve altering the volumetric flow rate of fluid flowing into the fluid-transmission lumen from the fluid source when the fluid-source coupler is coupled to the fluid source and the second valve is actuated;
a pistol grip disposed at the proximal end portion of the tubular body, the pistol grip having an interior lumen, the interior lumen of the pistol grip fluidly coupling the fluid-source coupler to the fluid-transmission lumen; and
a second valve actuator mechanically coupled to the second valve, the second valve actuator actuating the second valve when the second valve actuator is moved toward the pistol grip or away from the pistol grip.

5. The fluid-emission device of claim 1, further comprising a foot peg coupled to the tubular body.

6. The fluid-emission device of claim 1, wherein:
the fluid-transmission lumen has a circumferential perimeter, the circumferential perimeter of the fluid-transmission lumen having a length at the distal end portion of the tubular body; and
the spearhead has a circumferential perimeter, the circumferential perimeter of the spearhead tapering along the longitudinal axis of the tip member from a maximum length to a minimum length, the maximum length of the circumferential perimeter of the spearhead matching or exceeding the length of the circumferential perimeter of the fluid-transmission lumen at the distal end portion of the tubular body.

7. The fluid-emission device of claim 1, wherein:
the plate has a circumferential perimeter, the circumferential perimeter of the plate having a length; and
the spearhead has a circumferential perimeter, the circumferential perimeter of the spearhead tapering in a distal direction along the longitudinal axis of the tip member from a maximum length to a minimum length, the maximum length of the circumferential perimeter of the spearhead matching or exceeding the length of the circumferential perimeter of the plate.

8. The fluid-emission device of claim 1, wherein:
the fluid-emission lumens are disposed within a circumferential boundary on the plate, the circumferential boundary having a length; and
the spearhead has a circumferential perimeter, the circumferential perimeter of the spearhead tapering in a distal direction along the longitudinal axis of the tip member from a maximum length to a minimum length, the maximum length of the circumferential perimeter of the spearhead matching or exceeding the length of the circumferential boundary.

9. The fluid-emission device of claim 1, wherein the spearhead has a proximal end portion, a distal end portion, and a circumferential perimeter, the circumferential perimeter of the spearhead flaring at the proximal end portion of the spearhead in a distal direction along the longitudinal axis of the tip member from a first length to a maximum length, the circumferential perimeter of the spearhead tapering at the distal end portion of the spearhead along the longitudinal axis of the tip member from the maximum length to a minimum length.

10. The fluid-emission device of claim 1, wherein the tip member is integral to the tubular body.

11. The fluid-emission device of claim 1, wherein the tip member is slidably or rotatably separable from the tubular body.

12. The fluid-emission device of claim 1, wherein:
the inner surface of the tubular body having a helical thread at the distal end portion of the tubular body; and
the shaft has an outer surface, the outer surface of the shaft having a helical thread, the helical thread of the shaft separably mating with the helical thread of the tubular body when the shaft is inserted into the fluid-transmission lumen.

13. A fluid-emission device having a longitudinal axis and comprising:
a plate radially extending from the longitudinal axis of the fluid-emission device, the plate having a first side, a second side opposite the first side, and a plurality of fluid-emission lumens, each of the fluid-emission lumens extending through the plate from the first side of the plate to the second side of the plate;
a spearhead disposed opposite the second side of the plate from the first side of the plate, the spearhead extending along the longitudinal axis of the fluid-emission device;
a spacer disposed between the plate and the spearhead, the spacer extending along the longitudinal axis of the fluid-emission device and separating the spearhead from the fluid-emission lumens; and
a shaft disposed opposite the plate from the spacer, the shaft having a proximal end portion, a distal end portion, a longitudinal dimension, and a fluid-transmission channel, the fluid-transmission channel extending from the proximal end portion of the shaft to the distal end portion of the shaft and fluidly coupling to one of the fluid-emission lumens, the fluid-transmission channel being exposed to an environment external to the shaft along the longitudinal dimension of the shaft the shaft being sized and dimensioned to extend into a tubular body, wherein the fluid-transmission channel is on the outside of the shaft facing a portion of the inner surface of the tubular body.

14. The fluid-emission device of claim 13, wherein:
the fluid-emission lumens are disposed within a circumferential boundary on the plate, the circumferential boundary having a length; and
the spearhead has a circumferential perimeter, the circumferential perimeter of the spearhead tapering along the longitudinal axis of the fluid-emission device from a maximum length to a minimum length, the maximum length of the circumferential perimeter of the spearhead matching or exceeding the length of the circumferential boundary.

15. The fluid-emission device of claim 13, wherein:
the fluid-emission lumens are disposed within a circumferential boundary on the plate, the circumferential boundary having a length; and the spearhead has a proximal end portion, a distal end portion, and a circumferential perimeter, the circumferential perimeter of the spearhead flaring at the proximal end portion of the spearhead in a distal direction along the longitudinal axis of the fluid-emission device from a first length to a maximum length, the circumferential perimeter of the spearhead tapering at the distal end portion of the spearhead in a distal direction along the longitudinal axis of the fluid-emission device from the maximum length to a minimum length, the maximum length of the circumferential perimeter of the spearhead matching or exceeding the length of the circumferential boundary.

16. The fluid-emission device of claim 13, wherein the shaft has an outer surface and a plurality of fluid-transmission channels, each of the plurality of fluid-transmission channels extending from the proximal end portion of the shaft to the distal end portion of the shaft and fluidly coupling to a respective one of the fluid-emission lumens, the outer surface of the shaft having a helical thread.

17. The fluid-emission device of claim 13, further comprising:
   the tubular body, the tubular body having a proximal end portion, a distal end portion, a longitudinal dimension, and a fluid-transmission lumen extending along the longitudinal dimension of the tubular body from the proximal end portion of the tubular body to the distal end portion of the tubular body, each of the fluid-emission lumens fluidly coupling the fluid-transmission lumen to an environment outside the tubular body; and
   a fluid-source coupler disposed at the proximal end portion of the tubular body, the fluid-source coupler fluidly coupling the fluid-transmission lumen to a fluid source when the fluid-source coupler is coupled to the fluid source.

18. The fluid-emission device of claim 13, further comprising:
   the tubular body, the tubular body having a proximal end portion, a distal end portion, a longitudinal dimension, an inner surface, and a fluid-transmission lumen extending along the longitudinal dimension of the tubular body from the proximal end portion of the tubular body to the distal end portion of the tubular body, each of the fluid-emission lumens fluidly coupling the fluid-transmission lumen to an environment outside the tubular body, the inner surface of the tubular body having a helical thread at the distal end portion of the tubular body; and
   a fluid-source coupler disposed at the proximal end portion of the tubular body, the fluid-source coupler fluidly coupling the fluid-transmission lumen to a fluid source when the fluid-source coupler is coupled to the fluid source,
   wherein the shaft extends from the plate into the fluid-transmission lumen, the shaft having an outer surface and a plurality of fluid-transmission channels, each of the plurality of fluid-transmission channels extending from the proximal end portion of the shaft to the distal end portion of the shaft and fluidly coupling a respective one of the fluid-emission lumens to the fluid-transmission lumen, the outer surface of the shaft having a helical thread, the helical thread of the shaft separably mating with the helical thread of the tubular body when the shaft is inserted into the fluid-transmission lumen.

19. The fluid-emission device of claim 1, wherein the plate includes a flange, the flange having an upper planar surface and a lower planar surface, the upper and lower planar surfaces being transverse to the longitudinal axis of the tip member.

20. The fluid-emission device of claim 13, wherein the plate includes a flange, the flange having an upper planar surface and a lower planar surface, the upper and lower planar surfaces being transverse to the longitudinal axis of the fluid-emission device.

* * * * *